US006868217B1

(12) United States Patent
Moulton et al.

(10) Patent No.: US 6,868,217 B1
(45) Date of Patent: Mar. 15, 2005

(54) LONG REACH UNAMPLIFIED OPTICAL SONET/SDH CARD

(75) Inventors: Grant E. Moulton, Santa Rosa, CA (US); Jeff P. Hamilton-Gahart, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/628,848

(22) Filed: Jul. 31, 2000

(51) Int. Cl.$^7$ ................................................. G02B 6/00
(52) U.S. Cl. ..................................................... 385/135
(58) Field of Search .......................... 385/135, 94, 93, 385/35, 86, 89, 49

(56) References Cited

U.S. PATENT DOCUMENTS

| | | | | | |
|---|---|---|---|---|---|
| 3,872,236 | A | * | 3/1975 | Swengel, Sr. et al. ...... | 174/262 |
| 4,732,446 | A | * | 3/1988 | Gipson et al. ............ | 350/96.15 |
| 4,880,969 | A | * | 11/1989 | Lawrie ....................... | 250/221 |
| 5,155,786 | A | * | 10/1992 | Ecker et al. .................. | 385/94 |
| 5,182,632 | A | * | 1/1993 | Bechtel et al. .............. | 257/713 |
| 5,333,225 | A | * | 7/1994 | Jacobowitz et al. .......... | 385/93 |
| 5,513,073 | A | * | 4/1996 | Block et al. ................ | 361/719 |
| 6,132,104 | A | * | 10/2000 | Bliss et al. .................... | 385/53 |
| 6,146,025 | A | * | 11/2000 | Abbink et al. ................ | 385/88 |
| 6,259,840 | B1 | * | 7/2001 | Munoz-Bustamante et al. . | 385/39 |

FOREIGN PATENT DOCUMENTS

| | | | | | |
|---|---|---|---|---|---|
| GB | 2308895 | * | 9/1997 | ............. | G02F/1/01 |
| JP | 356019682 | * | 2/1981 | ................. | 257/432 |

* cited by examiner

Primary Examiner—J. F. Duverne
(74) Attorney, Agent, or Firm—Campbell Stephenson Ascolese LLP

(57) ABSTRACT

An assembly, method, and device for high-speed optical format data transmission includes a printed circuit board containing mounting locations for electrical components, optical components, and a heatsink device. A tray may also be mounted on the printed circuit board to route optical fiber to various components. The heatsink is positioned at a predetermined height above the printed circuit board so that it physically contacts the electrical and optical components that require cooling. The printed circuit board may include one or more openings in which one or more of the electrical or optical components that are significantly taller than the other components are embedded. The heatsink may also include one or more openings in which one or more of the taller electrical or optical components are positioned. Additional compliant heat conductive material may be placed between the top of one or more electrical or optical components and the heatsink when the components are not as high as the position of the heatsink. Material may also be removed from the bottom of one or more portions of the heatsink to accommodate one or more of the electrical or optical components that are slightly higher than the position of the heatsink. The layout of the printed circuit board assembly includes positioning the electrical and optical components for receiving data on one section of the printed circuit board, while the electrical and optical components for transmitting data are positioned on another section of the printed circuit board. The electrical and optical components that are sensitive to temperature variation are positioned near the portion of the printed circuit board that receives the greatest amount of cooling.

31 Claims, 4 Drawing Sheets

LONG REACH UNAMPLIFIED OPTICAL SONET/SDH CARD

BACKGROUND OF THE INVENTION

1. Field of the Invention

This invention generally relates to optical signal processing cards in add/drop multiplexers. More specifically, this invention relates to a high-speed optical signal processing card that incorporates electrical and optical components on a single card in an add/drop multiplexer.

2. Description of the Related Art

Optical networks are increasing in importance, and high speed digital signals are commonly transmitted using Synchronous Optical Network (SONET) and Synchronous Digital Hierarchy (SDH) standards at speeds ranging from 51.84 Mb/s (OC-1) to 9.95 Gb/s (OC-192). A wide range of equipment incorporates SONET/SDH transmission functionality, including add/drop multiplexers (ADMs) which allows digital transmission signals to be removed or inserted from incoming/outgoing optical streams.

Because space is limited in telecommunications equipment, it is essential to be able to provide the maximum amount of functionality in the minimum volume. As an example, optical cards in add/drop multiplexers must operate at very high speeds and must contain powerful optical components, but should not occupy multiple slots within the add/drop multiplexer. This can be particularly challenging at OC-192 operating speeds, where 10 gigabits per second signals must be routed around the card, and where high power optical components must be utilized. In addition, crosstalk and thermal issues must be addressed.

SUMMARY OF THE INVENTION

The present invention provides for a novel board which can support high speed optical transmission on a single card, and which does not require an optical amplifier to achieve OC-192 data rates through single node links up to 80 kilometers. This is accomplished through the use of a distributed feedback laser in conjunction with an external modulator. Separate transmit and receive sections are used on the board to reduce crosstalk. High speed electrical multiplexers and demultiplexers are used in conjunction with the optical components to achieve the high transmission rates on a single card.

Because of the density of optical and electrical components required to achieve high speed transmission, heat dissipation is a significant problem. A heatsink is utilized which covers more than 60% of the board and which makes contact with the optical and electrical components. For those components which do not have sufficient height to make contact with the heatsink, padding elements are utilized. For those components which exceed the clearance of the heatsink, cores are milled into the heatsink. This allows for use of a heatsink which has uniform clearance from the board but which allows for contact with a diversity of components through the use of padding and cores.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
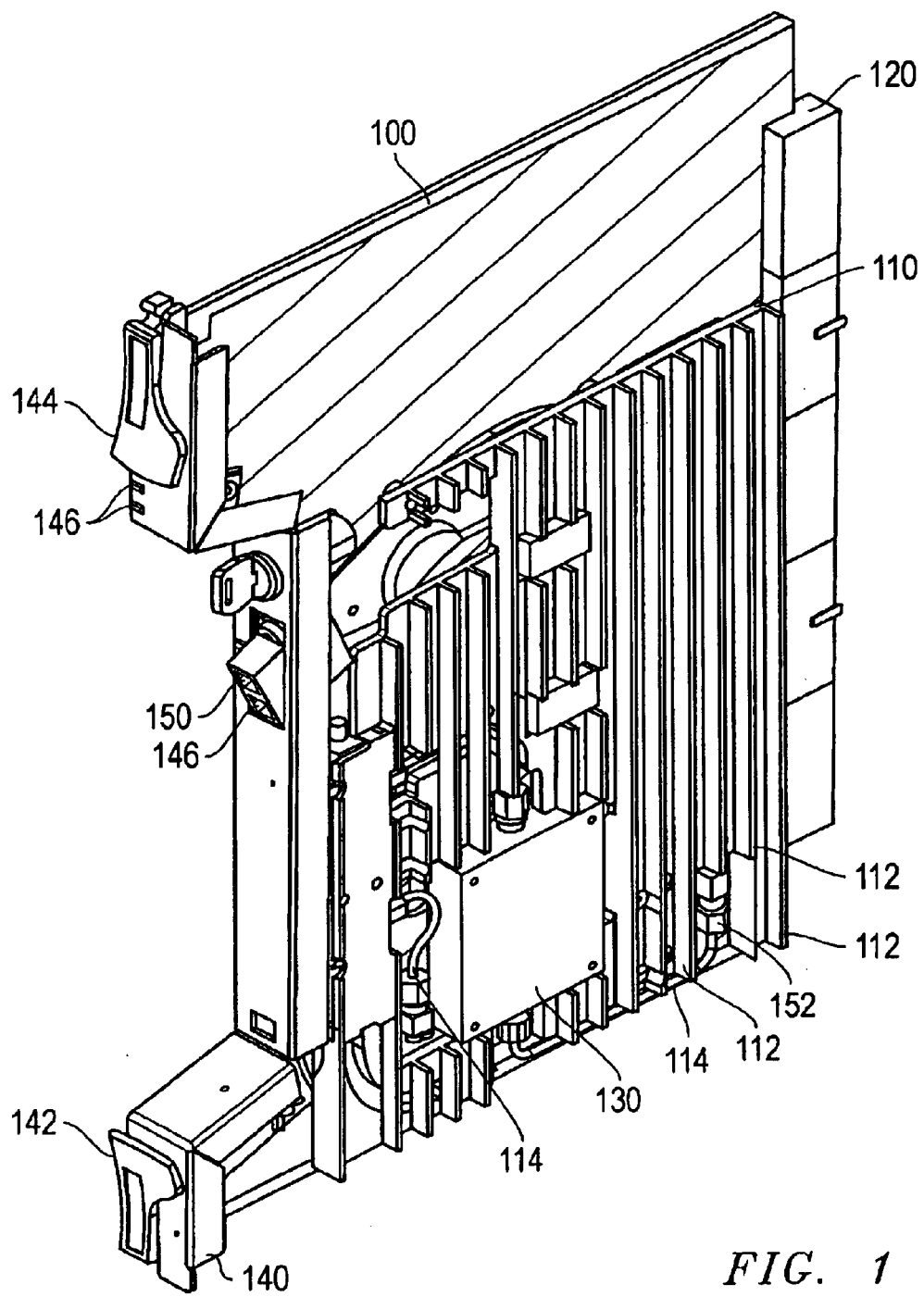
FIG. 1 illustrates a 3-D assembly side view of one embodiment of the invention.

FIG. 1 is a 3-dimensional assembly side view of one embodiment of the invention in which printed circuit board (PCB) 100 coupled with heatsink 110 having a plurality of cooling fins 112 is connected to the backplane of an add/drop multiplexer through backplane connector 120. Heatsink 110 is used to remove heat from both the electrical and optical components, which is dissipated through cooling fins 112. Semi-rigid coaxial cable 114 is utilized to connect high speed components such as modulator/driver 130 with other electrical and optical components.

Front plate 140 covers the front of PCB 100 and includes mechanisms 142, 144 for inserting and removing PCB 100 in a rack of equipment which forms an add/drop multiplexer. Front plate 140 may also include indicators, such as LEDs 146, which indicate the operating status of PCB 100. Front plate 140 may also include openings for access to receive (RX) port 148 and transmit (TX) port 150.

SONET is a data transmission mechanism known in the art that is defined by a set of electrical as well as optical standards. The basic building block in SONET is the synchronous transport signal level-1 (STS-1), which transports packets of data as a 51.840 Megabit per second serial transmission using an optical carrier level-1 (OC-1) optical signal. The grouping of a specified set of bytes in the STS-1 is called a frame. An STS-1 frame consists of 810 bytes (6480 bits). Optical carrier level-N (OC-N) and synchronous transport signal level-N (STS-N) correspond to the optical and electrical transmissions respectively, of the same data rate. Higher data rates are transported in SONET by synchronously multiplexing N lower level modules together. For example, OC-3 corresponds to a line rate of 155.52 (3 times 51.840) Megabytes per second, and OC-192 corresponds to 9953.28 (192 times 51.840) Megabytes per second. The electrical and optical components on PCB 100 are capable of communicating data at the OC-192 rate.

Figure 2:
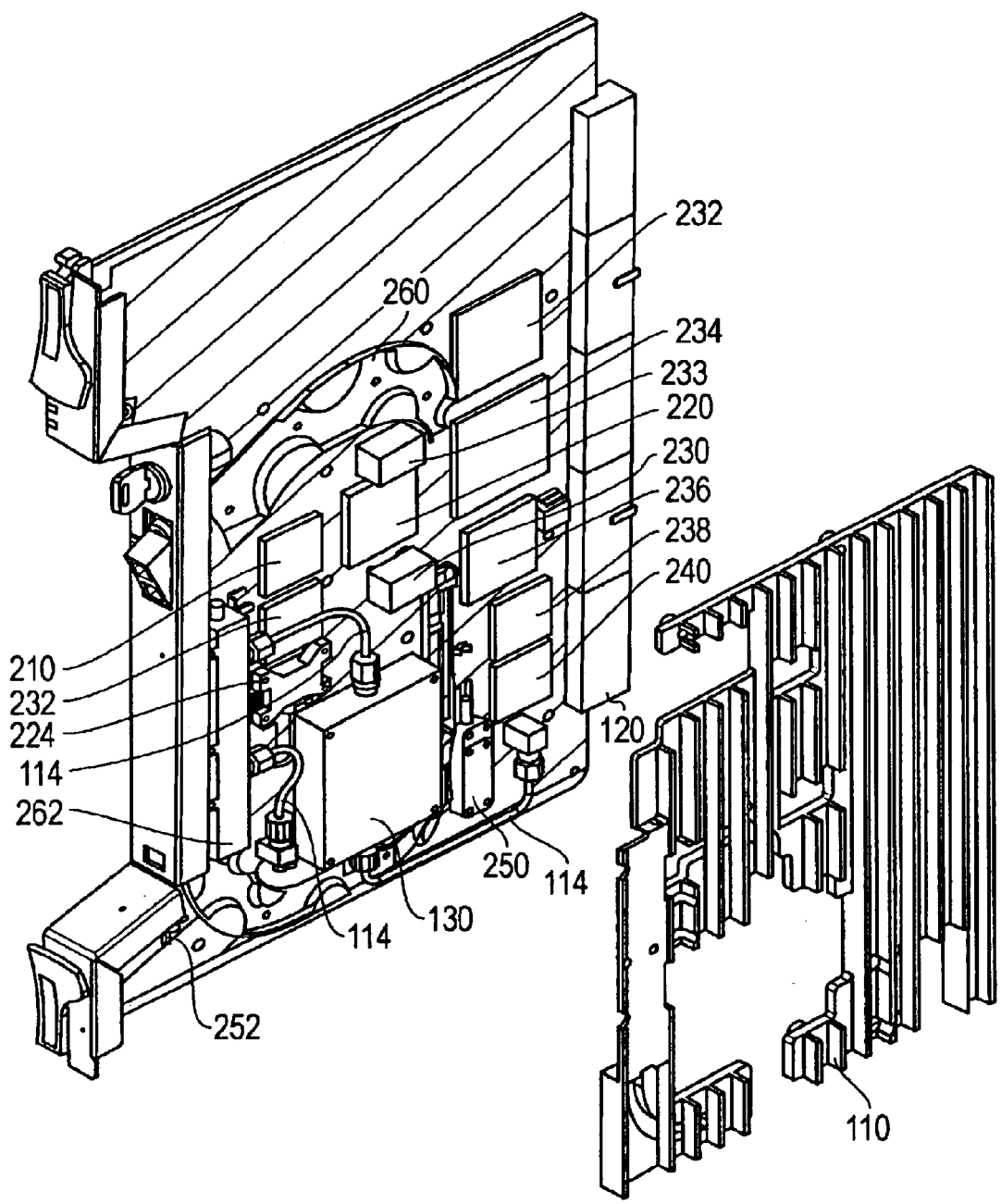
FIG. 2 illustrates a 3-D isometric view of one embodiment of the invention with the heatsink shown in an exploded view.

FIG. 2 illustrates a 3-dimensional isometric view of one embodiment of the invention with heatsink 110 shown in exploded view. FIG. 2 shows a plurality of electrical and optical components which enable transmission and reception of data at the OC-192 rate. Modulator/driver 130 is connected via semi-rigid coaxial cable 114 to external modulator 262. In one embodiment, modulator/driver 130 provides amplification of digital signals received from electrical components on PCB 100 and produces a 7 volt peak to peak signal which is received, via semi-rigid coaxial cable 114, by external modulator 262. In one embodiment, external modulator 262 is a commercially available titanium-diffused lithium niobate modulator. Distributed feedback (DFB) laser 250 is used in conjunction with external modulator 262 that incorporate gratings to compensate for the dispersion of the optical signals. In one embodiment, DFB laser 250 operates in the 1555–1560 nanometer range and produces 40 milliwatts minimum of optical output power.

Figure 3:
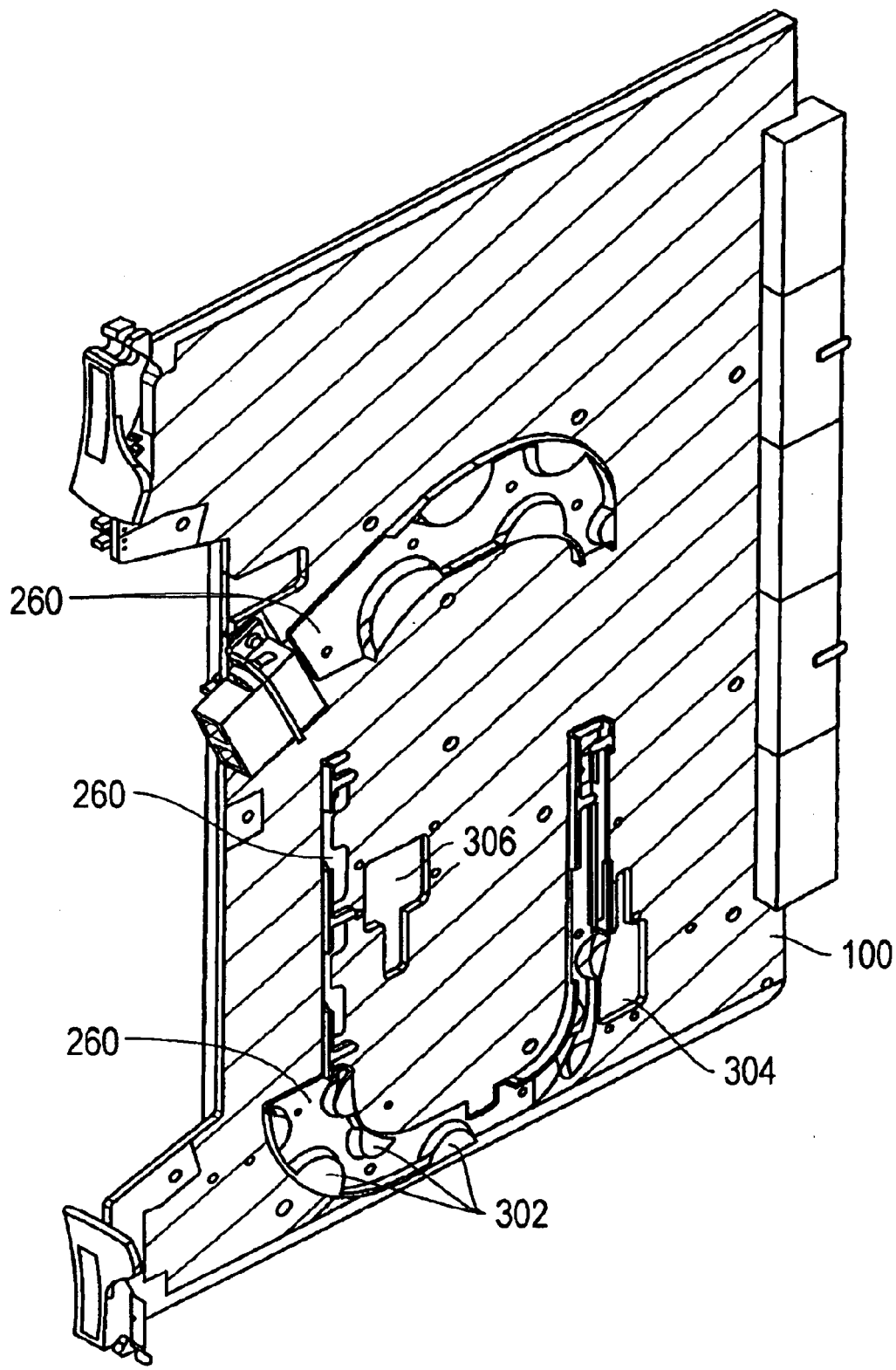
FIG. 3 illustrates the board layout with the fiber track.

Signals from DFB laser 250 are routed via optical fiber around fiber track 260 where it is subsequently received by external modulator 262. FIG. 3 shows one embodiment of fiber track 260 for retaining fiber cable and routing it to optical components on PCB 100. For example, the embodiment of fiber track 260 shown in FIG. 3 is positioned on PCB 100 to route fiber cable to and from optical components such as modulator/driver 130 and external modulator 262. Fiber track 260 may be substantially open to facilitate installing and removing fiber cable, and may include a plurality of overhanging tabs, such as tabs 302, to help retain fiber cable in fiber track 260. Fiber track 260 may also be used for routing various types of communication cables in addition to fiber optic cable.

Fiber track 260 may be one unitary structure, or it may include two or more sections as shown in FIG. 3. One or more of several known means may be used to retain fiber track 260 in PCB 100 including pegs (not shown) that snap into openings (not shown) in PCB 100.

Referring back to FIG. 2, avalanche photo diode receiver 224 receives optical signals. A DC bias monitor photo detector 252 is used in conjunction with external modulator 262 to obtain the appropriate DC biasing. In one embodiment, the avalanche photodiode receiver 224 is a Fujitsu FRM-5N142DSS/051 receiver.

The electrical components used to form electrical signals include a 1:16 demultiplexer 210 and a 16:64 demultiplexer 220 which can present the demultiplexed OC-192 signal to the ASIC (234). Amplifier 222 receives signals from avalanche photo diode receiver 224 and enables reception of high speed and heavily attenuated optical signals received on input optical fiber. The input optical fiber is connected to RX port 150. TX port 148 is connected to output optical fiber.

A microprocessor 232 is used to control the various components on PCB 100 including application specific integrated circuit (ASIC) 234 for 155 MHz cross-connection interfaces. A 64:16 multiplexer 236 is used in conjunction with a 16:1 multiplexer 238 to form signals for transmission.

The electrical and optical components on PCB 100 dissipate a substantial amount of heat, and it is important for heatsink 110 to maintain contact with key components. In the prior art, individual heatsink elements are affixed to the top of a corresponding component. In the present invention, heatsink 110 is dimensioned to contact all or a substantial number of key components on PCB 100, thereby reducing or even eliminating the need for numerous individual heatsink elements. Further, in some configurations, there is not enough room for adequately sized, individual heatsinks.

PCB 100 is typically installed in a slot in a rack that contains other equipment to form an add/drop multiplexer. The width of the slot is fixed, and in many cases, approximately the same amount of space is available on either side of the slot. It is desirable to provide a construction of PCB 100 and heatsink 110 that does not require neighboring slots in the rack to be left unoccupied to accommodate PCB 100. Further, PCB 100 and heatsink 110 must accommodate various sizes of components on PCB 100 while staying within the dimensions allowed.

One way to accommodate various dimensions of electrical and optical components within the space available in the rack is to include openings in PCB 100 into which the components may be embedded. The openings allow a component to occupy space on both sides of PCB 100. Advantageously, these openings allow components to be positioned at approximately the same height on the upper surface of PCB 100, so that the bottom side of heatsink 110 can be substantially flat. FIG. 3 shows an example of PCB 100 having a first opening 304 for embedding DFB laser 250 (FIG. 2), and a second opening 306 for embedding avalanche photodiode receiver 224.

Figure 4:
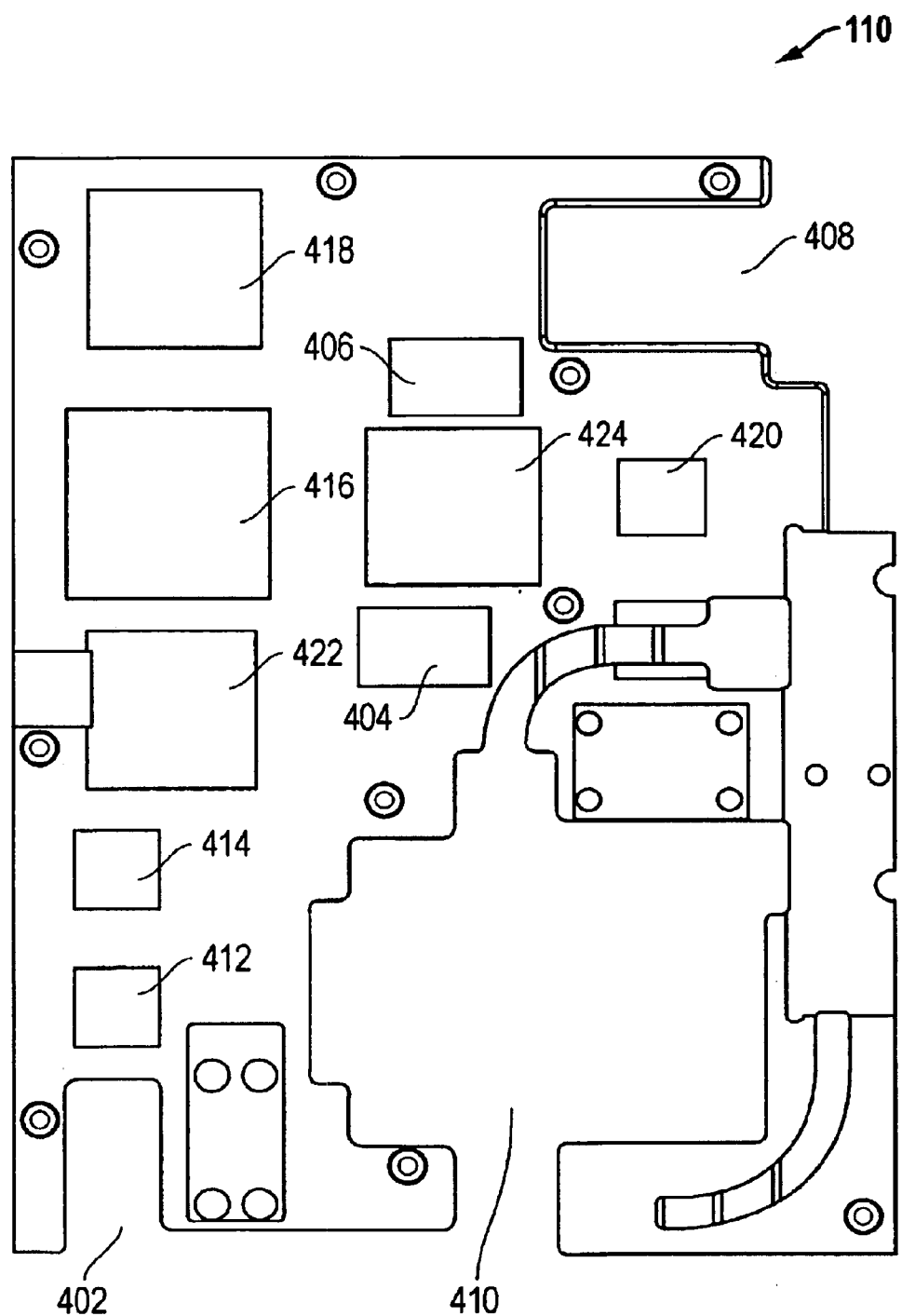
FIG. 4 illustrates a bottom view of the heatsink.

Another way to accommodate various dimensions of electrical and optical components within the space available in the rack is to include openings in heatsink 110. FIG. 4 shows an example of heatsink 110 with openings 402 through 410, which allow room for connector 152 (FIG. 1), voltage controlled crystal oscillator (VCXOS), receive and transmit ports 148, 150, and modulator driver 130, respectively.

An additional advantage of providing openings 304, 306 (FIG. 3) in PCB 100, and openings 402 through 410 (FIG. 4) in heatsink 110 is that the height of cooling fins 114 (FIG. 1) can remain substantially constant, as best illustrated in FIG. 2. This is because heatsink 110 can be mounted directly over a substantially constant level of other components on PCB 100. It is important to note that openings 402 through 410 may be dimensioned so that one or more of the sides of the openings contact the components that require cooling. Further, openings 402 through 410 may be dimensioned to accommodate components from the same or different vendors that may have different dimensions.

Another consideration in the construction of heatsink 110 is that the dimensions of components that lie under the heatsink 110 may vary between individual components. For example, the height of 1:16 demultiplexer 210 may vary from one demultiplexer to the next, even when supplied by the same component manufacturer. It is important for heatsink 110 to contact at least a portion of a component that requires cooling. When all of the components upon which heatsink 110 rests are the same height, heatsink 110 draws heat from the top of the components. This may not be achieved if the height of the component is lower than other components upon which heatsink 110 rests. A different problem can occur if the height of one or more components is higher than usual, because heatsink 110 will be raised above the top surface of the other components.

In one embodiment of the present invention, the problems associated with varying heights of components is alleviated by adding or removing heat-conductive material between the component and the bottom of heatsink 110. FIG. 4 shows outlines of pads 412, 414, 416, 418, and 420 where compliant heat conductive material has been added to contact the upper surface of components that are lower in height than other components. FIG. 4 also shows outlines of indentations 422, 424, where heat conductive material has been removed so that heatsink 10 contacts the upper surface of components that are greater in height than other components. Note that the amount of material added or removed may vary from component to component, depending on the variation in height.

In one embodiment, heatsink 110 is fastened to PCB 100 using bolts, however, any type of suitable fastening device or technique may be utilized. Fastening heatsink 110 to PCB 100 reinforces and improves the durability of PCB 100, especially in assemblies where there are a number of openings in PCB 100.

Another feature of the present invention is that transmit and receive components are positioned in separate sections to improve isolation, thereby reducing noise. For example, in the embodiment shown in FIG. 2, receive components including 1:16 demultiplexer 210, 16:64 demultiplexer 220, and amplifier 222, are positioned on one side of PCB 100, while transmit components including 64:16 multiplexer, 16:1 multiplexer, and modulator driver preamp 240 are positioned on the other side of PCB 100.

Another feature of the assembly shown in FIG. 2 is that components that are highly sensitive to temperature variations are positioned on PCB 100 so that they receive the largest volume and lowest temperature of cooling air. These components include, for example, modulator driver 130, and DFB laser 250.

Another feature of the present invention is that relatively low-cost printed circuit board material, commonly designated in the art as FR-4, may be used for PCB 100 for signals up to 10 gigahertz. PCB 100 also uses minimum high frequency trace lengths and large trace widths for minimum conductive loss in a coplanar structure. Additionally, the traces transition to semi-rigid coaxial cable 114 to interface with electrical components.

PCB 100 advantageously provides a relatively low cost, single card assembly for high-speed optical signal processing. PCB 100 requires less volume than known high-speed optical signal processors and is also hot-swappable for upgrading existing 15454 ONS OC-48 signal processing implementations. Further, the layout can easily adapt to take advantage of future component integration, cost reduction, and performance improvements with minimal change required in the layout of PCB 100.

The card assembly has error-free performance without an erbium doped fiber amplifier (EDFA) over an 80 kilometer fiber link of single node fiber. The card assembly also has error-free performance (without an EDFA) over low dispersion single node fiber and negative dispersion single node fiber. The error-free performance is due to the 40-milliwatt minimum power DFB laser 250 and external modulator 262, which incorporates gratings for dispersion compensation.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A printed circuit board assembly for high-speed optical format data transmission comprising:
   a printed circuit board;
   a plurality of optical components mounted to the printed circuit board;
   a plurality of electrical components mounted to the printed circuit board; and
   a heatsink attached to the printed circuit board wherein
      the heatsink interfaces directly with a plurality of the electrical and optical components, and
      the printed circuit board includes one or more openings in which one or more of the electrical or optical components are embedded.

2. The printed circuit board assembly of claim 1, further comprising a tray mounted on the printed circuit board for routing optical fiber.

3. A printed circuit board assembly for high-speed optical format data transmission comprising:
   a printed circuit board;
   a plurality of optical components mounted to the printed circuit board;
   a plurality of electrical components mounted to the printed circuit board; and
   a heatsink attached to the printed circuit board wherein
      the heatsink interfaces directly with a plurality of the electrical and optical components, and
      the heatsink includes one or more openings in which one or more of the electrical or optical components are embedded.

4. The printed circuit board assembly of claim 3, wherein at least a portion of the perimeter of the openings interfaces with the one or more corresponding electrical or optical components.

5. The printed circuit board assembly of claim 1, further comprising:
   additional compliant heat conductive material between the top of one or more electrical or optical components and the heatsink.

6. The printed circuit board assembly of claim 1, wherein the electrical and optical components for receiving data are positioned on one section of the printed circuit board, and the electrical and optical components for transmitting data are positioned on another section of the printed circuit board.

7. The printed circuit board assembly of claim 1, wherein the electrical and optical components that are sensitive to temperature variation are positioned near the portion of the printed circuit board that receives the greatest amount of cooling.

8. A method for dissipating heat from electrical components and optical components on a printed circuit board, the method comprising:
   determining an average height of the electrical components and the optical components with respect to the printed circuit board;
   forming openings in the printed circuit board corresponding to at least some of the electrical components and optical components that are significantly higher than the average height;
   embedding the at least some of the significantly higher electrical components and optical components in the openings in the printed circuit board; and
   attaching a heatsink member to the printed circuit board so that the heatsink member is in direct contact with at least a portion of each electrical and optical component that requires cooling.

9. The method of claim 8, further comprising mounting a tray on the printed circuit board; and routing optical fiber in the tray.

10. The method of claim 8, further comprising:
    adding heat conductive material between the top of one or more electrical or optical components and the heatsink.

11. The method of claim 8, comprising:
    removing material from the bottom of one or more portions of the heatsink to accommodate one or more of the electrical or optical components.

12. The method of claim 8, further comprising:
    positioning the electrical and optical components for receiving data on one section of the printed circuit board; and positioning the electrical and optical components for transmitting data on another section of the printed circuit board.

13. The method of claim 8, further comprising: positioning the electrical and optical components that are sensitive to temperature variation near the portion of the printed circuit board that receives the greatest amount of cooling.

14. A method for dissipating heat from electrical components and optical components on a printed circuit board, the method comprising:
    determining an average height of the electrical components and the optical components with respect to the printed circuit board;
    forming openings in a heatsink corresponding to at least some of the electrical components and optical components that are significantly higher than the average height;

positioning the heatsink over the significantly higher electrical components and optical components on the printed circuit board; and attaching a heatsink member to the printed circuit board so that the heatsink member is in direct contact with at least a portion of each electrical and optical component that requires cooling.

15. The method of claim 14, further comprising mounting a tray on the printed circuit board; and routing optical fiber in the tray.

16. The method of claim 14, further comprising:

adding compliant heat conductive material between the top of one or more electrical or optical components and the heatsink.

17. The method of claim 14, further comprising:

removing material from the bottom of one or more portions of the heatsink to accommodate one or more of the electrical or optical components.

18. The method of claim 14, further comprising: positioning the electrical and optical components for receiving data on one section of the printed circuit board; and positioning the electrical and optical components for transmitting data on another section of the printed circuit board.

19. The method of claim 14, further comprising: positioning the electrical and optical components that are sensitive to temperature variation near the portion of the printed circuit board that receives the greatest amount of cooling.

20. A device for high-speed optical format data transmission comprising:

means for mounting electrical components, optical components, and a heatsink device;

a plurality of optical components mounted to the means for mounting;

a plurality of electrical components mounted to the means for mounting; wherein the means for mounting includes one or more openings in which one or more of the electrical or optical components are embedded, and means, attached to the means for mounting, for interfacing directly with, and dissipating heat from, a plurality of the electrical and optical components.

21. The device of claim 20, further comprising means for routing optical fiber.

22. A device for high-speed optical format data transmission comprising:

means for mounting electrical components, optical components, and a heatsink device;

a plurality of optical components mounted to the means for mounting;

a plurality of electrical components mounted to the means for mounting; and means, attached to the means for mounting, for interfacing directly with, and dissipating heat from, a plurality of the electrical and optical components, wherein
the means for interfacing includes one or more openings in which one or more of the electrical or optical components are positioned.

23. The device of claim 22, wherein at least a portion of the perimeter of the openings interfaces with the one or more corresponding electrical or optical components.

24. The device of claim 20, further comprising:

additional compliant heat conductive material between the top of one or more electrical or optical components and the means for interfacing.

25. The device of claim 20, wherein the electrical and optical components for receiving data are positioned on one section of the means for mounting, and the electrical and optical components for transmitting data are positioned on another section of the means for mounting.

26. The device of claim 20, wherein the electrical and optical components that are sensitive to temperature variation are positioned near the portion of the means for mounting that receives the greatest amount of cooling.

27. An apparatus comprising:

a printed circuit board;

an optical component mounted to the printed circuit board, wherein the optical component is operable to receive a digital data signal;

an electrical component mounted to the printed circuit board, wherein the electrical component is operable to receive the digital data signal; and a heatsink attached to the printed circuit board wherein the heatsink interfaces directly with the electrical component and the optical component, and at least one of the electrical component and the optical component is embedded in an opening in the printed circuit board.

28. The apparatus of claim 27, further comprising a tray mounted on the printed circuit board for routing optical fiber.

29. An apparatus comprising:

a printed circuit board;

an optical component mounted to the printed circuit board, wherein the optical component is operable to receive a digital data signal;

an electrical component mounted to the printed circuit board, wherein the electrical component is operable to receive the digital data signal; and a heatsink attached to the printed circuit board wherein the heatsink interfaces directly with the electrical component and the optical component, the height of the electrical component and the optical component is substantially the same on one side of the printed circuit board, the heatsink is attached to the one side of the circuit board, and the heatsink interfaces with at least the top of the electrical component and at least the top of the optical component.

30. The apparatus of claim 27, wherein the heatsink further includes cooling fins.

31. An apparatus comprising:

a printed circuit board;

an optical component mounted to the printed circuit board, wherein the optical component is operable to receive a digital data signal;

an electrical component mounted to the printed circuit board, wherein the electrical component is operable to receive the digital data signal; and a heatsink attached to the printed circuit board wherein the heatsink interfaces directly with the electrical component and the optical component, and material is removed from the bottom of one or more portions of the heatsink to accommodate one or more of the electrical or optical components.

* * * * *